United States Patent
Faibish et al.

(10) Patent No.: US 10,505,864 B1
(45) Date of Patent: Dec. 10, 2019

(54) METHOD FOR RUNNING HPC JOBS

(71) Applicant: EMC IP Holding Company LLC, Hopkinton, MA (US)

(72) Inventors: Sorin Faibish, Newton, MA (US); John M. Bent, Los Alamos, NM (US); James M. Pedone, Jr., West Boylston, MA (US); James J. Moore, Los Angeles, CA (US); Percy Tzelnic, Concord, MA (US); Dominique P. Cote, Cambridge, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 128 days.

(21) Appl. No.: 14/041,864

(22) Filed: Sep. 30, 2013

(51) Int. Cl.
*H04L 12/911* (2013.01)
(52) U.S. Cl.
CPC ................................. *H04L 47/78* (2013.01)
(58) Field of Classification Search
CPC .................................................... H04L 67/061
See application file for complete search history.

(56) References Cited

U.S. PATENT DOCUMENTS

| | | |
|---|---|---|
| 8,244,874 B1 | 8/2012 | Thireault |
| 8,255,529 B2 | 8/2012 | Ferris et al. |
| 8,351,453 B2 | 1/2013 | Park et al. |
| 8,402,139 B2 | 3/2013 | Ferris et al. |
| 8,433,749 B2 | 4/2013 | Wee et al. |
| 8,442,498 B2 | 5/2013 | Yin et al. |
| 8,631,099 B2 | 1/2014 | Morgan |
| 8,745,242 B2 | 6/2014 | Dawson et al. |
| 8,782,341 B1 * | 7/2014 | Niranjan ............. G06F 11/1076 711/114 |
| 9,104,885 B1 * | 8/2015 | Strand ...................... G06F 21/62 |
| 9,979,780 B1 | 5/2018 | Faibish et al. |
| 2005/0108703 A1 * | 5/2005 | Hellier ...................... G06F 8/60 717/174 |
| 2008/0082601 A1 | 4/2008 | Meijer et al. |

(Continued)

FOREIGN PATENT DOCUMENTS

| | | |
|---|---|---|
| CN | 101364899 A | 2/2009 |
| CN | 102104631 A | 6/2011 |

(Continued)

OTHER PUBLICATIONS

OnStar Connections, "5 Tips to Get the Most Out of your Subscription," http://www.onstarconnections.com, 2011, 5 pages.

(Continued)

*Primary Examiner* — Ario Etienne
*Assistant Examiner* — Sm Z Islam
(74) *Attorney, Agent, or Firm* — Ryan, Mason & Lewis, LLP

(57) ABSTRACT

A computer-executable method, system, and computer program product for managing a cloud computing resource in communication with a data storage system, the computer-executable method, system, and computer program product comprising receiving configuration information at the data storage system related to a host application; determining an optimized configuration for the host application; and creating an implementation of the optimized configuration based on one or more resources enabled to be accessed by the data storage system.

20 Claims, 16 Drawing Sheets

(56) References Cited

U.S. PATENT DOCUMENTS

| | | |
|---|---|---|
| 2011/0131335 A1 | 6/2011 | Spaltro et al. |
| 2011/0153868 A1 | 6/2011 | Castleberry et al. |
| 2011/0213875 A1 | 9/2011 | Ferris et al. |
| 2011/0238458 A1 | 9/2011 | Purcell et al. |
| 2011/0270963 A1 | 11/2011 | Saito et al. |
| 2011/0273625 A1 | 11/2011 | McMahon et al. |
| 2011/0295998 A1 | 12/2011 | Ferris et al. |
| 2011/0314082 A1 | 12/2011 | Koneti et al. |
| 2012/0079480 A1 | 3/2012 | Liu |
| 2012/0081299 A1 | 4/2012 | Xiao et al. |
| 2012/0124194 A1 | 5/2012 | Shouraboura |
| 2012/0124211 A1 | 5/2012 | Kampas et al. |
| 2012/0158821 A1 | 6/2012 | Barros |
| 2012/0239739 A1 | 9/2012 | Manglik et al. |
| 2012/0303740 A1* | 11/2012 | Ferris ............ G06F 17/30194 709/217 |
| 2013/0080509 A1 | 3/2013 | Wang |
| 2013/0080623 A1 | 3/2013 | Thireault |
| 2013/0111034 A1 | 5/2013 | Upadhya |
| 2013/0117286 A1* | 5/2013 | Gallant ............... G06F 7/24 707/752 |
| 2013/0238752 A1 | 9/2013 | Park et al. |
| 2013/0238805 A1* | 9/2013 | Catrein ............... H04L 47/70 709/226 |
| 2013/0332979 A1 | 12/2013 | Baskaran et al. |
| 2014/0278812 A1* | 9/2014 | Reinhold ......... G06Q 10/0637 705/7.36 |
| 2014/0344316 A1* | 11/2014 | Baranowsky ...... G06F 16/1827 707/827 |

FOREIGN PATENT DOCUMENTS

| | | |
|---|---|---|
| CN | 102143025 A | 8/2011 |
| WO | 2012053243 A1 | 4/2012 |

OTHER PUBLICATIONS iClarified, "Verizon FiOS Mobile App Lets You Program Your DVR Using iPad," http://www.iclarified.com, 2010, 2 pages.

\* cited by examiner

METHOD FOR RUNNING HPC JOBS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, system, and computer program product for managing a cloud computing resource in communication with a data storage system, the computer-executable method, system, and computer program product comprising receiving configuration information at the data storage system related to a host application; determining an optimized configuration for the host application; and creating an implementation of the optimized configuration based on one or more resources enabled to be accessed by the data storage system.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Traditionally, cloud computing services have allowed for High Performance Computing (HPC) in the cloud. Typically, cloud computing services allow for primitive customization of HPC in the cloud according to capability and/or price, but do not provide information in regards to efficiency and/or optimization of cloud computing resources. Generally, optimization solutions to improve efficiency, and/or performance of a cloud computing service would be useful and may not have been previously possible.

Control and Monitoring of Cloud Applications

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
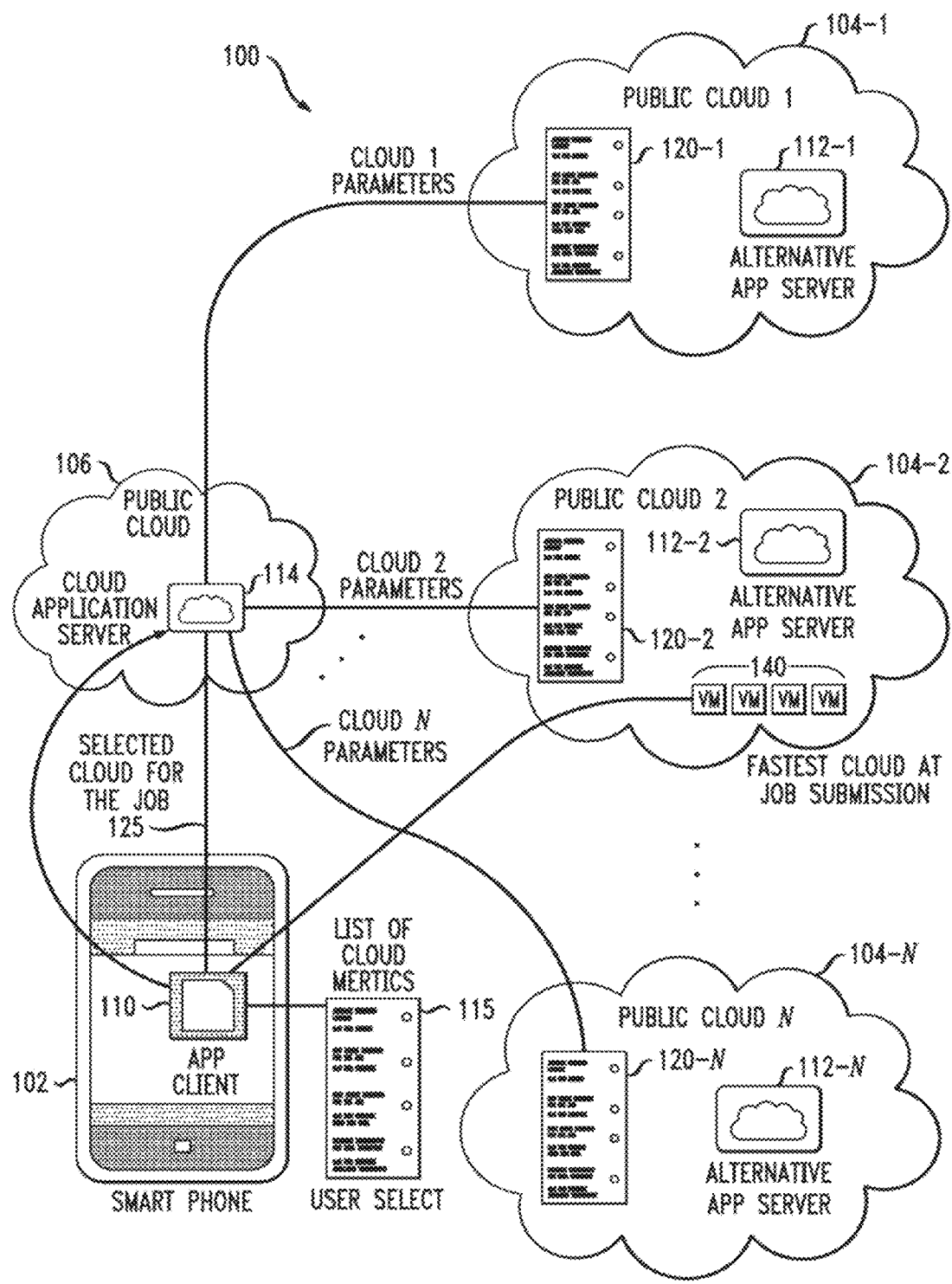
FIG. 1 is a simplified illustration of a block diagram of an information processing system, in accordance with an embodiment of the present disclosure.

Refer now to the example embodiment of FIG. 1. FIG. 1 shows an information processing system 100 configured in accordance with an illustrative embodiment of the present invention. The information processing system 100 comprises a user device 102, illustratively implemented as a mobile telephone, also referred to as a "smart phone," and cloud infrastructure illustratively comprising a plurality of candidate public clouds 104-1, 104-2, . . . 104-N and an additional public cloud 106. The user associated with user device may be an individual, a business enterprise, an IT administrator or other type of user. The term "user" as utilized herein is therefore intended to be broadly construed so as to encompass a human user as well as an inanimate system entity. Also, the term may refer to a human user, an associated device or set of devices, or a combination of both a human user and an associated device or set of devices. The same reference numeral 102 may be used for all of these cases, with the particular user arrangement being understood from the context.

Although the user device 102 is shown as a mobile telephone in the figure, other embodiments can utilize other types of user devices, such as laptop or desktop computers, tablet computers, or other processing devices suitable for interacting with cloud infrastructure over one or more networks.

The user or users associated with user device 102 may be considered tenants of one or more of the clouds 104 or 106 of the cloud infrastructure of system 100. Also, although illustratively identified as a public cloud in the figure, the cloud 106 may instead be a private cloud associated with the user or users.

Moreover, the system 100 can of course be configured to support a large number of user devices, although only a single user device is shown in the figure for simplicity and clarity of illustration. Also, multiple users may be permitted to access current status information and other data associated with a given processing job that is executing in one or more of the clouds 104 of the cloud infrastructure. For example, each processing job that is executing may be provided with a unique job identifier, and users that enter the job identifier and an appropriate password may obtain access to the associated job data. Other types of authentication mechanisms may be implemented in system 100 in order to ensure the security of the processing jobs as those jobs are executed in the cloud infrastructure.

The cloud infrastructure of system 100 may be viewed as comprising physical infrastructure and associated virtualization infrastructure running on the physical infrastructure, and such infrastructure or portions thereof may be implemented using one or more processing devices of a processing platform. Examples of processing platforms that may form at least portions of the cloud infrastructure in system 100 will be described in more detail below in conjunction with FIGS. 6 and 7.

As noted above, the system 100 in the present embodiment implements various processes that provide enhanced user control over processing jobs that are executed in public clouds 104 of the cloud infrastructure. An example of such a process will be described in conjunction with FIG. 5, but it is to be appreciated that numerous other types of processes may be used in other embodiments.

A given cloud infrastructure processing device or user processing device generally comprises at least one processor and an associated memory, and includes one or more functional modules for controlling certain features of the system 100.

For example, the user device 102 in the present embodiment may comprise a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. This memory and other memories disclosed herein may be viewed as examples of what are more generally referred to as "computer program products" storing executable computer program code.

The user device 102 may also include network interface circuitry that is configured to allow the user device to communicate over one or more networks with the cloud infrastructure of system 100, and possibly with other user devices, and may comprise one or more conventional transceivers. The one or more networks may include, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

Similar processor, memory and network interface elements may be utilized in processing devices that provide public clouds 104 and 106 of the cloud infrastructure.

In the present embodiment, the user device 102 implements an application client 110, and each of the N public clouds 104 implements an application server 112. Also, the additional public cloud 106 implements an application server 114, also referred to in the figure as a cloud application server. The application client 110 and application servers 112 and 114 are generally implemented at least in part in the form of software that is stored in a memory and executed by a processor using one or more processing devices of the type described above. By way of example, one or more of the application servers 112 and 114 may be implemented as application plug-ins for other applications that perform additional functions within their respective public clouds 104 or 106.

The system 100 is generally configured to support informed selection of one or more of the public clouds 104 to execute a particular processing job on behalf of a requesting user. Thus, using the application client 110 and the application servers 112 and 114, multiple candidate clouds generally representing at least a subset of the public clouds 104 are identified as candidate clouds for performing the processing job for the requesting user. The public clouds 104 will therefore also be referred to herein as candidate clouds. Respective sets of parameters are collected from the different candidate clouds with each such set of parameters characterizing at least one aspect of a manner in which the processing job would be performed in the corresponding candidate cloud. Information is compiled that characterizes the collected sets of parameters so as to permit informed selection of at least one of the candidate clouds for performing the processing job.

The term "compiled" in this context is intended to be broadly construed so as to encompass, for example, selection of particular parameters or associated values from at least a portion of the collected parameter sets for presentation or other processing, or comparison of one or more parameter values from each of at least a portion of the collected parameter sets so as to generate a recommendation. Numerous other types of compilation of information characterizing parameter sets are contemplated in other embodiments. Also, the parameter sets are intended to be broadly construed, and a given such set may in some instances relate, for example, to only a single specified parameter involving cloud performance.

The application servers 112 are more particularly identified in the figure as alternative application servers because each is associated with a different candidate public cloud 104 that may represent an alternative execution environment for a particular processing job of a requesting user.

The actual selection of one or more of the candidate clouds to perform a particular processing job may be made by the requesting user, or automatically by another system entity, such as the application server 114 in public cloud 106. The collection of parameter sets and compilation of information characterizing those sets may also be performed by the application server 114, through interaction with the alternative application servers 112 in the respective public clouds 104.

In an implementation in which the selection between the various candidate clouds for performing a given processing job is made by the application server 114, the application server may cache relevant parameters sets and other information characterizing the performance of the public clouds 104 on other possibly related processing jobs, for the requesting user or possibly other users. The application server 114 can also maintain an up-to-date sorted list of the available resources of each of the public clouds 104 and then decide on behalf of the requesting user the best selection of cloud resources for use with a particular processing job. In such an arrangement, the user may select the metrics required for the job, and the application server 114 can do the rest automatically, including selecting the best cloud or clouds for execution of the processing job and reporting appropriate monitoring information back to requesting user as the processing job runs in the selected cloud(s). The application server may therefore decide to use multiple clouds for a given processing job if the required resources for that job are not available in a single cloud.

In an implementation in which the selection between the various candidate clouds for performing a given processing job is made by the user, the system 100 may be configured to present at least a portion of the compiled information characterizing the collected sets of parameters to the user in a manner that permits the user to select at least one of the candidate clouds for performing the processing job.

The application server 114 may be initiated responsive to instructions received from the application client 110 running on the user device 102. The application server 114 can then interact with the alternative application servers 112 in the respective candidate clouds 104 in order to collect the parameter sets. The application server 114 compiles information characterizing those collected parameter sets, and presents via one or more user interface screens of the user device 102 at least a portion of the compiled information in a manner that permits the user to select at least one of the candidate clouds for performing the processing job. The processing job itself may involve running one or more applications on at least one virtual machine of at least one selected cloud.

The identification of which of the public clouds 104 will be considered candidate clouds for performance of a given processing job may be made responsive to input from the user defining one or more requirements of the processing job. Alternatively, all of the public clouds 104 or a predetermined subset of these public clouds may be considered candidate clouds for the processing job.

The user input may be provided using the application client 110 running on the user device 102. In the present embodiment, a list of cloud metrics may be provided in a user interface screen 115 presented on the user device, such that the user can select from among the presented cloud metrics the particular ones that are important for the current processing job, and can also specify requirements for those metrics.

Figure 2:
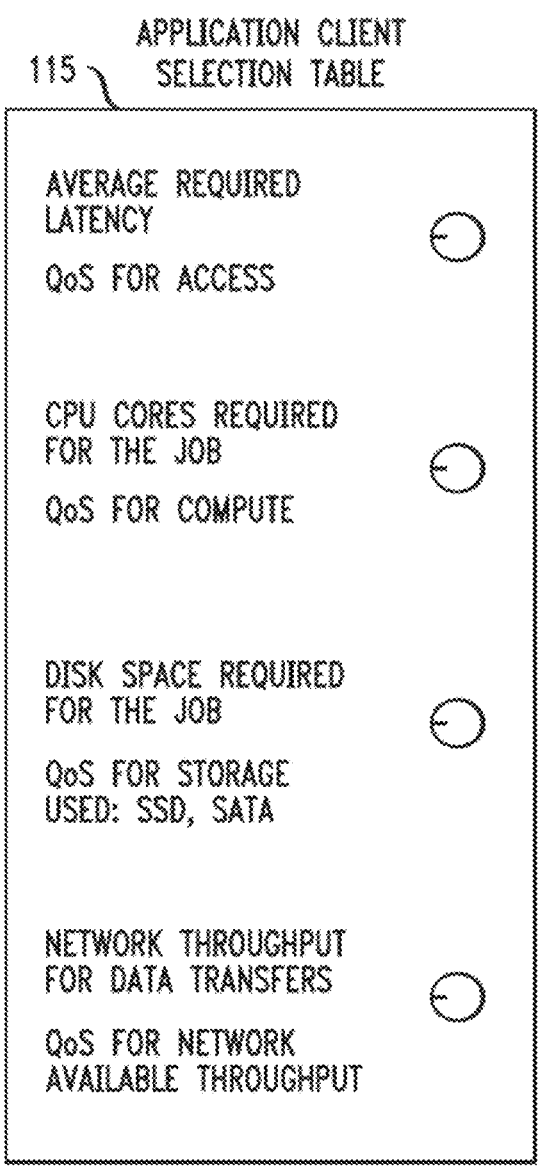
FIGS. 2-4 are simplified illustrations of interface screens that may be utilized in the system of FIG. 1, in accordance with an embodiment of the present disclosure.

Refer now to the example embodiment of FIG. 2. A more detailed view of an exemplary user interface screen 115 is shown in FIG. 2, and allows user specification of average required latency, number of central processing unit (CPU) cores required for the job, disk space required for the job, and network throughput for data transfers. These specific metrics may be considered examples of Quality of Service (QoS) metrics for performance of the processing job, although the user interface screen in the present embodiment is also configured to allow direct user specification of QoS requirements for access, compute, storage, available throughput and possibly other QoS requirements for the processing job. Within each of these categories, additional selectability may be provided, such as user selection between utilization of solid state drives (SSDs) and serial advanced technology attachment (SATA) drives for performance of the processing job.

Figure 3:
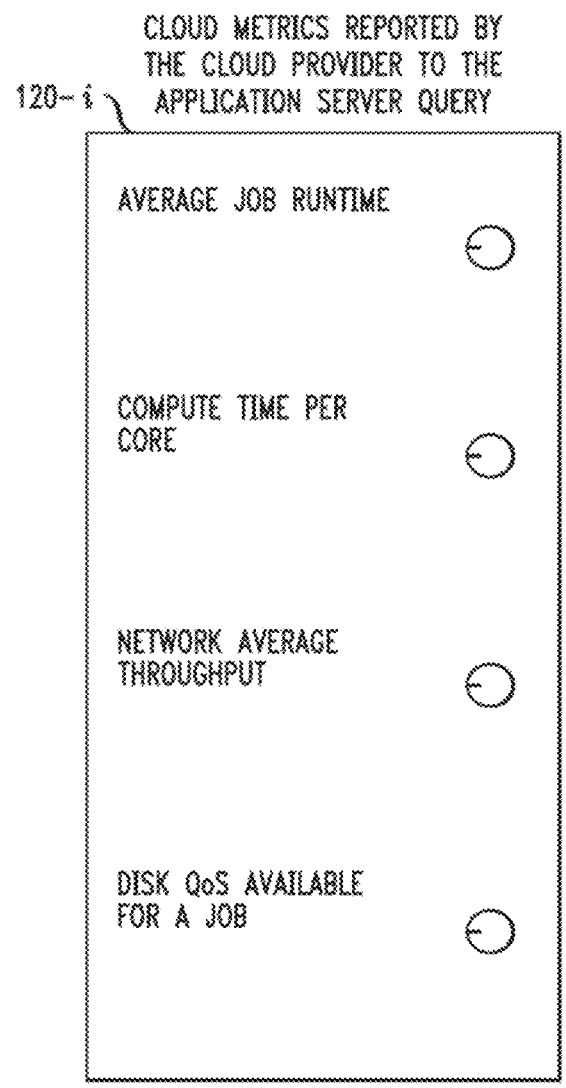

Thus, the user can enter particular requirements for the processing job via the user interface screen 115. The user input is provided from the application client 110 to the application server 114 of public cloud 106 as indicated. The application server 114 interacts with each of the alternative application servers 112 to collect respective sets of parameters 120 from the plurality of different candidate clouds. FIG. 3 shows an example of a given such set of parameters 120-$i$, $i=1, 2, \ldots N$, for one of the candidate clouds 104-$i$. The set of parameters collected from the candidate cloud 104-$i$ in this example includes specific values, ranges or other information characterizing one or more of average job runtime, compute time per CPU core, network average throughput, and disk QoS available for the job. These parameters may be reported by the corresponding cloud service provider via its application server 112 responsive to a query from the application server 114.

The same information may be collected from each of the other candidate clouds, or different information may be collected from different ones of the candidate clouds. Each such set of information 120 may also be presented as an interface screen on user device 102, under the control of the application client 110 and the application servers 112 and 114, such that the various capabilities of each of the candidate clouds relative to the current processing job are made apparent to the user.

The application server 114 can also provide the user with an indication of predicted QoS available for the processing job from one or more of the public clouds 104 if it is not possible for any of those clouds to achieve the particular QoS requested by the user. In such a situation, the application server may request a lower fee for the job from one or more of the cloud service providers in view of their inability to achieve the requested QoS. If at least a given one of the cloud service providers agrees to the lower fee, the user may be provided with a choice between paying the lower fee to accept the lower predicted QoS available from that cloud service provider, or paying more in an attempt to achieve a higher QoS than that predicted by the cloud service provider.

Although the application server 114 in this embodiment is illustratively shown as running in an additional cloud 106 that is separate from the candidate clouds 104, in other embodiments the application server 114 may be implemented in one of the candidate clouds 104, or its functionality may be distributed across multiple such clouds. As noted above, selection between candidate clouds may be performed automatically by the application server 114, based on collected and compiled information characterizing the relative performance capabilities of the candidate clouds 104 for the current processing job. Thus, the application server 114 may be configured to select one or more of the candidate clouds 104 that will actually execute the processing job. A given processing job may therefore be divided between two or more of the public clouds that are selected from a larger group of up to N candidate clouds, where N is greater than two.

In the FIG. 1 embodiment, information regarding the selected cloud for the processing job is communicated between the application client 110 and the application server 114 as illustrated by interaction 125. It is assumed by way of example that a single public cloud 104-2 is selected from among the candidate clouds 104 to perform the processing job, as a result of that public cloud being determined as the fastest of the candidate clouds at the time of job submission, based on multiple parameters that were gathered from the alternative application servers 112 of the respective candidate clouds by the application server 114. Performance of the processing job may involve interaction between the application client 110 and the selected public cloud 104-2. The processing job is executed using a set of virtual machines 140 of the public cloud 104-2.

Figure 4:
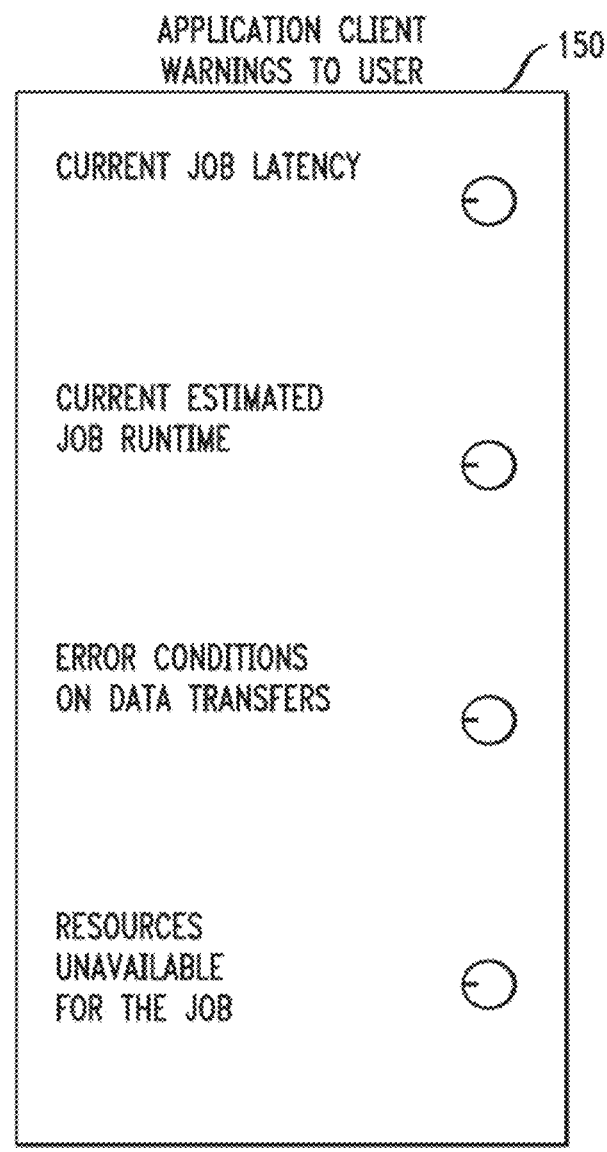

Once the processing job is executing in the selected cloud 104-2, the application client 110 and application servers 112 and 114 may be configured to permit the requesting user to monitor and/or control the processing job. For example, one or more processing metrics relating to execution of the processing job in the selected cloud may be presented to the requesting user via the application client 110 on user device 102. FIG. 4 illustrates one possible user monitoring arrangement, in the form of a user interface screen 150 that is provided on user device 102 and includes information regarding current job latency, current estimated job runtime, error conditions on data transfers, and resources that are unavailable for the job. The interface screen 150 may be utilized to present warnings to the user via the application client 110 relating to the monitored metrics. For example, any metrics that fall below the requirements specified by the user may be highlighted accordingly.

Also, the user may be permitted to control at least one controllable feature of the processing job as it is executing in the selected cloud 104-2, again via one or more interface screens presented on the user device 102 under the control of the application client 110 and one or more of the application servers 112 and 114.

By way of example, the ability to monitor and/or control a given processing job can include determining if the progress of the job has met requirements, identifying the reason or reasons that any aspect of the job has not met requirements, and sending requests to the cloud service provider to remedy the issue. Thus, if an application that is part of the processing job is waiting for a certain cloud resource such as a storage, processing or network transmission resource, an appropriate warning can be sent to the user. A user may also be provided with an opportunity to pay more for higher priority access to the resource.

It is to be appreciated that the particular set of elements shown in FIG. 1 for providing enhanced user involvement in processing job execution in one or more public clouds is presented by way of illustrative example, and in other embodiments additional or alternative elements may be used. Thus, another embodiment may include additional or alternative arrangements of user devices, application clients, application servers, and candidate clouds or other cloud infrastructure.

For example, in one alternative embodiment, the application client 110 on user device 102 could interact directly with the alternative application servers 112 of the respective public clouds 104, such that public cloud 106 and application server 114 could be eliminated. However, use of application server 114 external to user device 102 may be preferred in an arrangement in which user device 102 comprises a mobile telephone or other mobile device with limited battery power. This is because the process of collecting and compiling information from the public clouds in order to allow informed selection of a particular cloud or clouds for performing a processing job can require significant computational resources, and it may be desirable to avoid consuming such resources on the mobile device. Accordingly, in the present embodiment, the application client 110 on the user device 102 initiates application server 114 to provide at least the collecting and compiling functionality, and to report back to the application client as needed, thereby conserving user device resources.

In another possible embodiment of system 100, the application server 114 may be associated with an Internet service provider or other entity that acts as a broker for the public clouds 104 but is otherwise independent of the corresponding cloud service providers. Such an arrangement is particularly useful for those individuals, business entities, IT administrators or other users that do not want to incur the costs or complexities associated with implementation and maintenance of application server 114 or its associated cloud 106.

The broker implementing the application server 114 may receive commissions from the cloud service providers of the respective public clouds 104 for any processing jobs that the broker places with those clouds, and can negotiate with the cloud service providers for access to any public cloud parameter sets or other information required to deliver the service to users. Also, the broker can sell various QoS levels to users and select particular available public cloud resources for use in meeting a requested QoS level for a given processing job. The user may pay the broker in accordance with the achieved QoS level.

The broker can also move resources during a given processing job between multiple clouds in order to meet QoS requirements that a single cloud service provider could not otherwise meet on its own. The broker can ensure that security requirements are met, for example, by generating private keys for the user without itself maintaining copies of the keys. Also, the broker can run applications in the cloud infrastructure that monitor the public clouds 104 in the event that the associated cloud service providers do not fully expose all necessary operating parameters. The broker can possibly make such monitoring results available back to the cloud service providers.

As mentioned previously, various elements of system 100 such as computers, servers, storage devices or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

The operation of the system 100 will now be described in greater detail with reference to the flow diagram of FIG. 5, which shows a set of operations performed at least in part using the cloud infrastructure of system 100 in an illustrative embodiment.

The process as shown includes steps 200 through 208, which are assumed to be performed using elements of the cloud infrastructure such as processing devices of public cloud 106 and one or more of the public clouds 104, although in other embodiments one or more such steps may be implemented at least in part by other system elements. Again, the term "user" is intended to be broadly construed, and may refer to the user device 102 or an associated entity, or may collectively refer to a combination of both the user device and an associated entity. Embodiments of the invention are not limited in terms of the particular user configuration utilized.

In step 200, input is received from a requesting user defining one or more requirements of a processing job to be performed in cloud infrastructure. The term "processing job" as used herein is intended to encompass any type of functionality that may be performed in cloud infrastructure for a particular user, and will generally involve the execution of at least one application, which may include, for example, an application that involves processing, storing and transmitting user data.

It is to be understood that the term "application" as used herein is intended to be broadly construed. Accordingly, references herein to multiple applications should be understood to encompass, for example, a set of entirely different applications or a set of different instances of a given application, as well as various combinations of different applications and application instances. An application instance is therefore considered a type of application as that latter term is broadly applied herein.

In step 202, a plurality of different candidate clouds are identified for performing the processing job for the requesting user at least in part responsive to the user input received in step 200.

In step 204, respective sets of parameters are collected from the plurality of different candidate clouds with each such set of parameters characterizing at least one aspect of a manner in which the processing job would be performed in the corresponding candidate cloud.

In step 206, information characterizing the collected sets of parameters is compiled so as to permit informed selection of at least one of the candidate clouds for performing the processing job. As indicated previously, this selection may be made by the user or by another system entity. For example, the selection may be made automatically by the application server 114 in accordance with input previously provided by the user.

In step 208, the requesting user is permitted to monitor and/or control the processing job as it is executing in the selected cloud(s).

Figure 5:
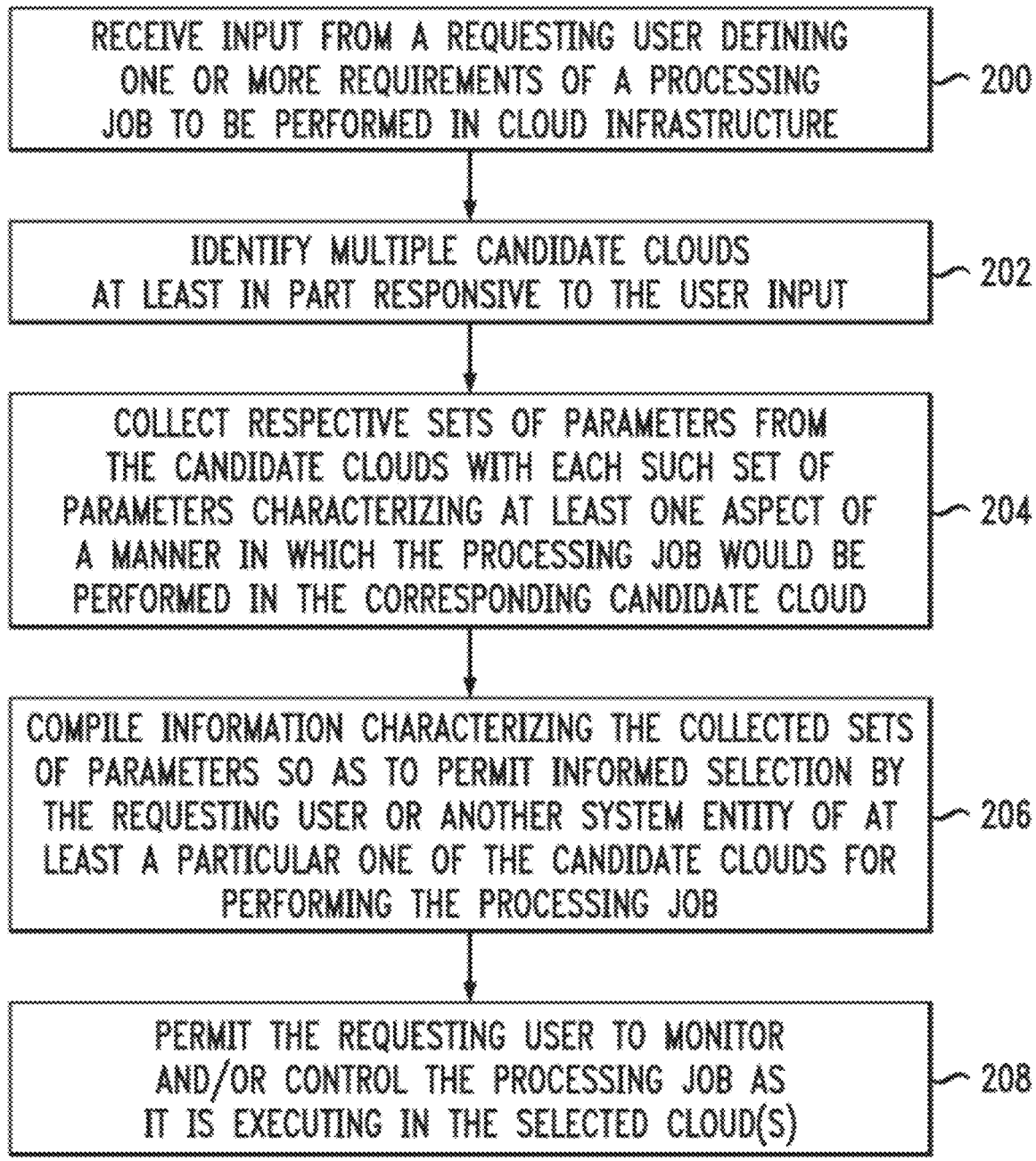
FIG. 5 is a simplified flow chart of a process for selecting between multiple candidate clouds, in accordance with an embodiment of the present disclosure.

The process as illustrated in FIG. 5 may be repeated serially for each of a plurality of processing jobs of the requesting user, or multiple instances of the process may be performed at least in part in parallel for multiple processing jobs of the user. Also, similar processes can be performed on behalf of other users that utilize the public clouds 104 of the cloud infrastructure of system 100.

The particular processing operations and other system functionality described in conjunction with the flow diagram of FIG. 5 are presented by way of illustrative example only, and should not be construed as limiting the scope of the invention in any way. Alternative embodiments can use other types of processing operations for providing user control over processing job execution in system 100. For example, the ordering of the process steps may be varied in other embodiments, or certain steps may be performed concurrently with one another rather than serially. Also, as indicated above, one or more of the process steps may be repeated periodically for a given user, or performed in parallel for the given user or multiple users.

It is to be appreciated that functionality such as that described in conjunction with the flow diagram of FIG. 5 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

The above-described embodiments can provide a number of significant advantages relative to conventional practice. For example, one or more of these embodiments can be used to ensure that a particular processing job is being run in an optimal manner that satisfies the particular QoS needs of the requesting user. Users are provided with an ability to select in an informed manner a particular cloud or clouds for executing a given processing job, leading to enhanced user satisfaction with cloud-based services. This can lead to more widespread adoption of public cloud processing models, and as a result will ultimately benefit not only users but also cloud service providers.

Also, one or more of the disclosed embodiments can provide a user with the flexibility to build its own set of criteria to monitor the applications or other processing jobs running in the cloud infrastructure of system 100. Users can evaluate the efficiency and other performance metrics of the processing job, and thereby ensure that they are receiving a level of performance that is satisfactory to them, or can renegotiate with the cloud service provider for different QoS requirements as appropriate.

Figure 6:
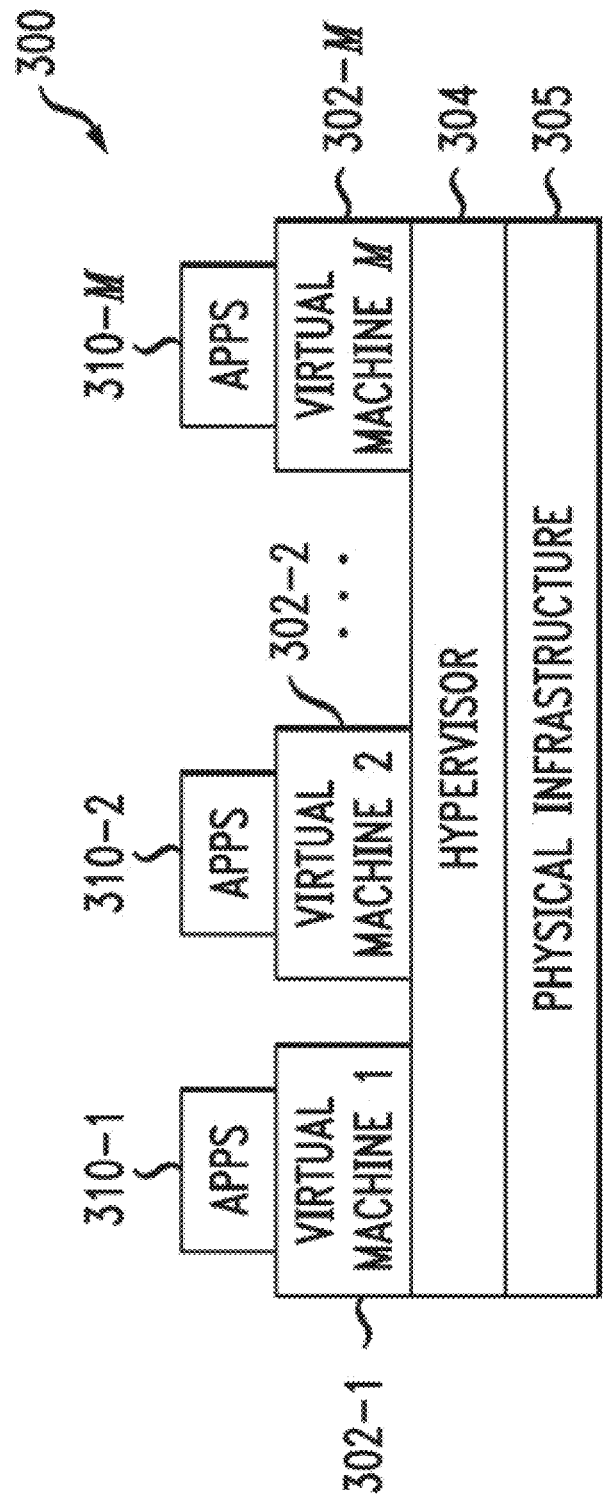
FIGS. 6-7 are simplified illustrations of processing platforms that may be utilized to implement at least a portion of the FIG. 1 system, in accordance with an embodiment of the current disclosure.

Referring now to the example embodiment of FIG. 6, portions of the information processing system 100 in this embodiment comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304. The cloud infrastructure 300 may be viewed as providing an example of what is more generally referred to herein as "virtual infrastructure." The cloud infrastructure 300 may encompass the entire system 100 or only portions of that system, such as the cloud infrastructure comprising at least a portion of the public clouds 104 and 106. Thus, the candidate clouds may be viewed as comprising one or more of the virtual machines 302.

Although only a single hypervisor 304 is shown in the embodiment of FIG. 6, the system 100 may of course include multiple hypervisors each providing a set of virtual machines using at least one underlying physical machine.

An example of a commercially available hypervisor platform that may be used to implement hypervisor 304 and possibly other portions of the cloud infrastructure of information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the cloud infrastructure of system 100.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 6 may represent at least a portion of one processing platform. Another example of such a processing platform is processing platform 400 shown in FIG. 7.

The processing platform 400 in this embodiment comprises a portion of the system 100 and includes a plurality of processing devices, denoted 402-1, 402-2, 402-3, . . . 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Figure 7:
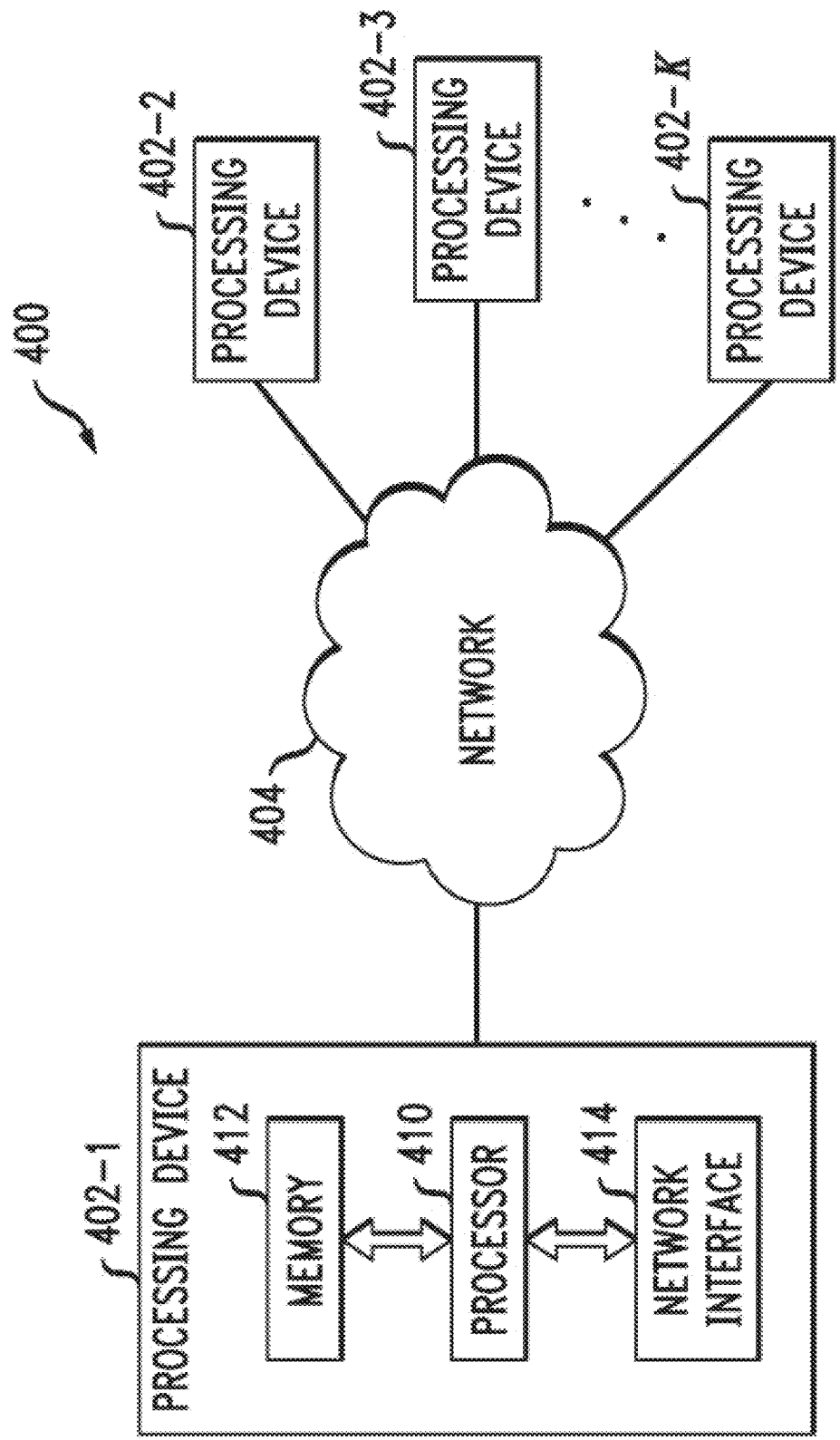

Multiple elements of information processing system 100 may be collectively implemented on a common processing platform of the type shown in FIG. 6 or 7, or each such element may be implemented on a separate processing platform.

It should again be emphasized that the above-described embodiments of the invention are presented for purposes of illustration only. Many variations and other alternative embodiments may be used. For example, the disclosed techniques are applicable to a wide variety of other types of devices and systems that can benefit from intelligent selection between multiple candidate clouds. Also, the particular configuration of system and device elements shown in FIGS. 1, 6 and 7, the interface screens shown in FIGS. 2-4, and the cloud selection process shown in FIG. 5, can be varied in other embodiments. Moreover, the particular cloud metrics or other parameters that are collected from the candidate clouds, the particular information that is compiled from such parameters, and the manner in which selection among candidate clouds is performed using such information, may be altered in other embodiments in order to suit the needs of a particular implementation. These and numerous other alternative embodiments within the scope of the appended claims will be readily apparent to those skilled in the art.

Optimizing HPC Jobs in Public Clouds

In many embodiments, the current disclosure may enable optimization of High Performance Computing (HPC) implementation in cloud computing services. In various embodiments, the current disclosure may enable optimization of data storage systems implemented in cloud computing services. In certain embodiments, a user and/or admin may be enabled to optimize implementations of data storage services in cloud computing services. In some embodiments, a user and/or admin may be enabled to optimize cloud computing services from one or more mobile devices.

In many embodiments, cloud platforms may aggregate a wide range of hardware resources that may be made available to users in a virtual environment. In various embodiments, cloud platforms may be enabled to use slow and fast disks. In certain embodiments, cloud platforms may be enabled to use a variable amount of memory. In other embodiments, cloud platforms may be enabled to utilize variable quality and/or speeds of networks. In some embodiments, cloud platforms may be enabled to use slim and fat virtual computing resource that may be enabled to access Quality of Service associated resources. In many embodiments, the current disclosure may be enabled to optimize usage of cloud platform resources to effectively use public clouds. In various embodiments, the current disclosure may be enabled to balance a user's budget and computing needs to enable effective use of public clouds, private clouds, and hardware resources.

In many embodiments, a user and/or admin may be enabled to modify an HPC implementation in a cloud platform according to performance and/or availability of resources in the cloud platform. In various embodiments, cloud platform resources may include various storage options, various network options, and/or various Quality of Service (QoS) options. In certain embodiments, storage may include, but not limited to, ephemeral storage, elastic block storage, and/or durable storage. In other embodiments, each storage type may include multiple sub-levels of storage which may be of varying costs. In many embodiments, a storage type may include a rotational disk and/or a flash device, where each device may be priced accordingly. In various embodiments, an interconnecting network may enable data throughput of differing speeds (i.e., 1 Gbit, 10 Gbit, and 40 GBit) where each interconnecting network may be priced accordingly. In certain embodiments, Quality of service (QoS) options may be available on cloud computing platforms.

In many embodiments, a user and/or admin may be enabled to optimize and/or allocate various cloud computing services on an as needed basis. In various embodiments, a user and/or admin may be enabled to make choices that may cause executing a job to be inexpensive or expensive according to the configuration of the associated cloud computing resource. In certain embodiments, a user and/or admin may be enabled to use a mobile/web application that will enable configuration of a cloud computing system automatically based on a set of requirements of the user. In some embodiments, a user and/or admin may be enabled to create an optimized script that may be submitted to a cloud computing system to create, allocate, and/or run HPC and data storage systems in the cloud and may be enabled to achieve a fast run time and economical cost.

Figure 8:
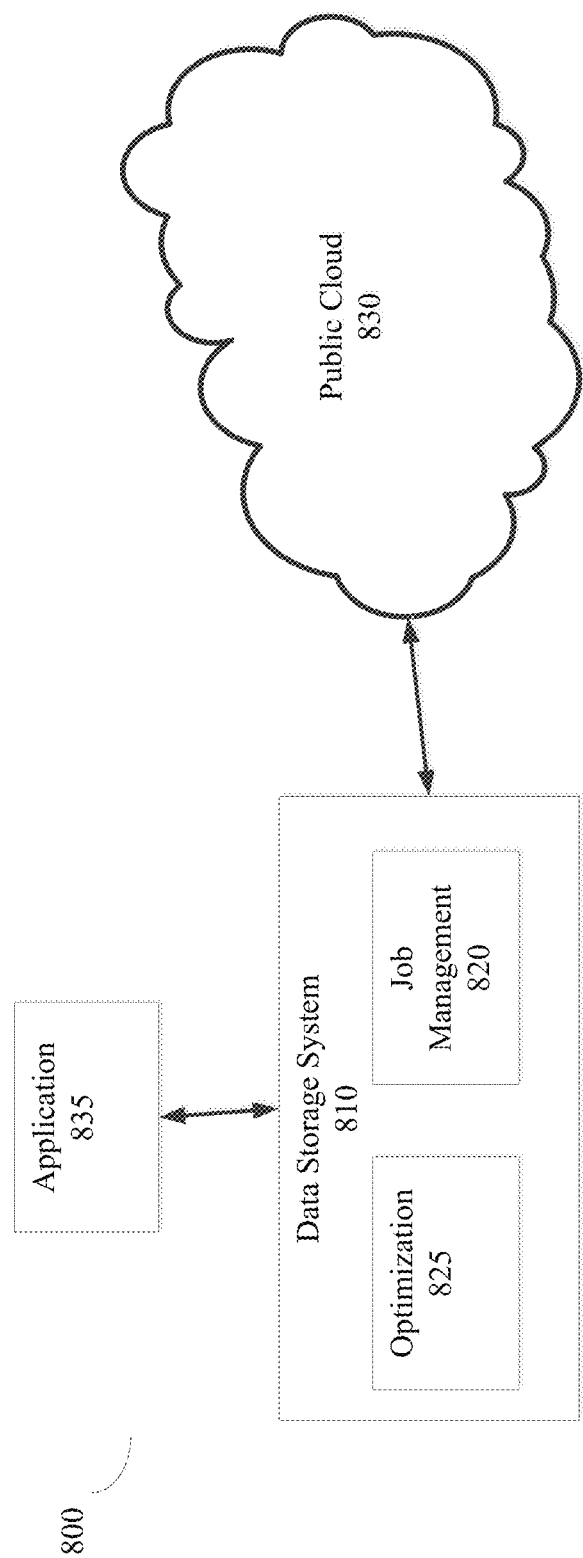
FIG. 8 is a simplified illustration of a data storage system in communication with a public cloud, in accordance with an embodiment of the present disclosure.

Refer now to the example embodiment of FIG. 8. FIG. 8 is a simplified illustration of a data storage system in communication with a public cloud, in accordance with an embodiment of the present disclosure. As shown, data storage system 810 includes optimization module 825 and job management module 820. Data storage system 810 is enabled to communicate with public cloud 830. In this embodiment, application 835 is enabled to be executed using hardware accessible through data storage system 810. Data storage system 810 is enabled to support execution of application 835 using resources available in public cloud 830. As shown, job management is enabled to receive data input/output (I/O) requests from application 835 and process each data I/O request using resources in public cloud 830. Job management 820 is enabled to be configured to manage usage of public cloud 830 based on application 835 requirements and/or cost requirements. Job management 820 is enabled to use optimization module 825 to optimize usage of public cloud 830. Optimization module 825 is enabled to make weighted selections of resources in public cloud 830 based on mappings of resources and/or cost analysis.

Figure 9:
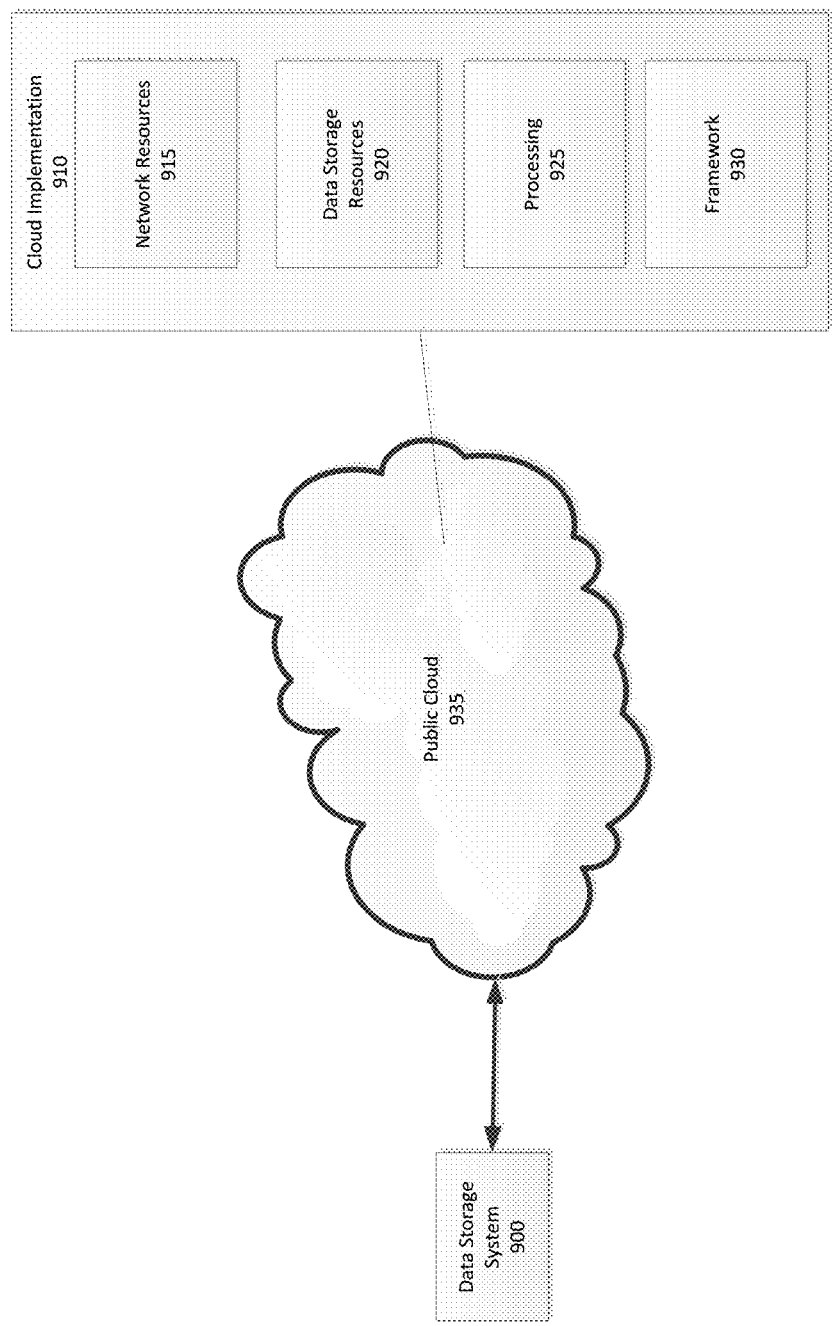
FIG. 9 is a simplified illustration of an implementation of a public cloud, in accordance with an embodiment of the present disclosure.

Refer now to the example embodiment of FIG. 9. FIG. 9 is a simplified illustration of an implementation of a public cloud, in accordance with an embodiment of the present disclosure. As shown, data storage system 900 is in communication with public cloud 935. Public cloud 935 includes cloud implementation 910, which enables access to network resources 915, data storage resources 920, processing resources 925, and framework resources 930. Each available resource within cloud implementation 910 is enabled to provide one or more levels of resources based on cost and/or performance. For example, in many embodiments, data storage resources may include ephemeral storage, elastic block storage, and/or durable storage, wherein each type of storage may have sub-levels of serve and/or differing cost per type of storage. In this embodiment, data storage system 900 is enabled to utilize one or more resources of cloud implementation 910 through public cloud 935.

Figure 10:
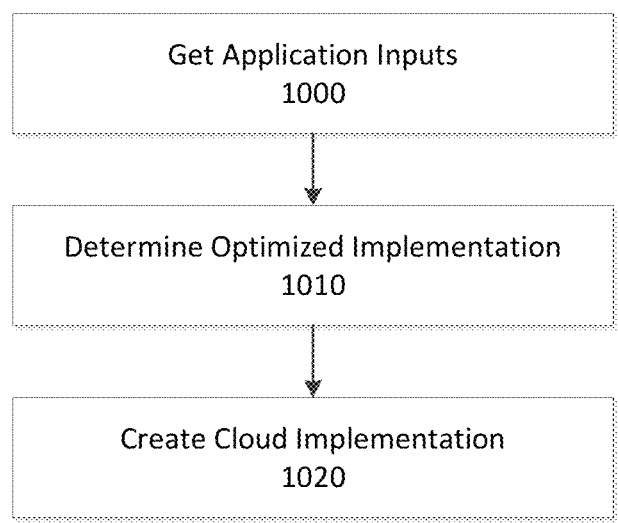
FIG. 10 is a simplified flow chart of a method of optimizing a data storage system, in accordance with an embodiment of the present disclosure.

Refer now to the example embodiment of FIGS. 8 and 10. FIG. 10 is a simplified flow chart of a method of optimizing a data storage system as shown in FIG. 8, in accordance with an embodiment of the present disclosure. As shown, data storage system 810 includes optimization module 825 and job management module 820. Data storage system 810 is in communication with public cloud 830. In this embodiment, application 835 requires data storage resources to execute. Data storage system 810 receives application inputs (Step 1000) from application 835. In many embodiments, application inputs may include configuration information, an available amount of funds to be spent on running the application, and/or Quality of Service (QoS) requirements requested by the application. Job management 820 takes application inputs and uses optimization module 825 to optimize a configuration for public cloud 830 (Step 1010). Job management module 820 creates cloud implementation (Step 1020) by requesting resources within public cloud 830. As shown, Application 835 executes through data storage system 810 utilizing resources within public cloud 830.

Figure 11:
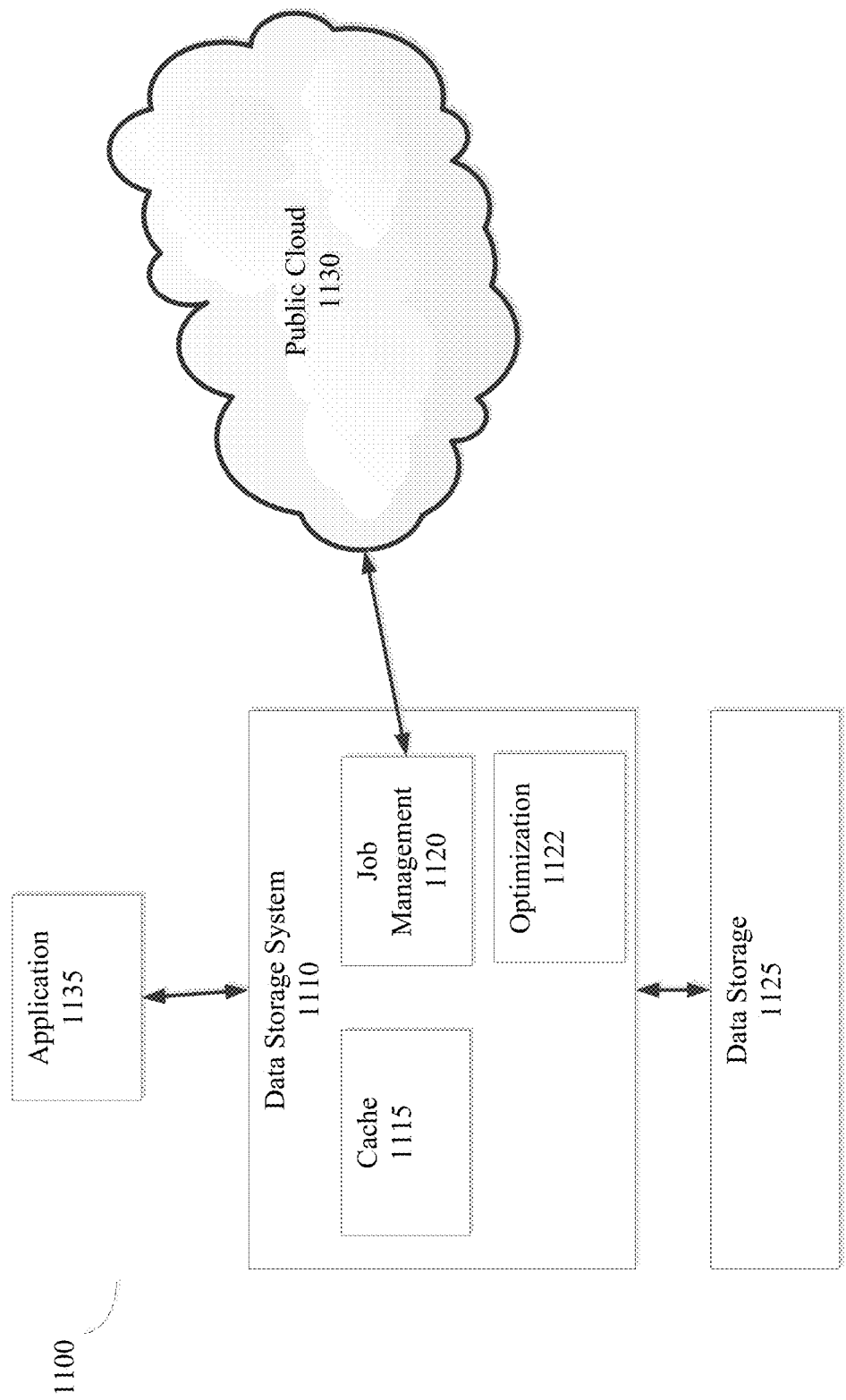
FIG. 11 is an alternative simplified illustration of a data storage system in communication with a public cloud, in accordance with an embodiment of the present disclosure.

Refer now to the example embodiment of FIG. 11. FIG. 11 is an alternative simplified illustration of a data storage system in communication with a public cloud, in accordance with an embodiment of the present disclosure. As shown, Data storage system 1110 includes job management module 1120, optimization module 1122, and cache 1115. Data storage system 1110 is enabled to communicate with data storage 1125, public cloud 1130, and application 1135. In this embodiment, data storage system 1110 is enabled to use local resources and resources from public cloud 1130. Data storage system 1110 is enabled to receive configuration information from application 1135 and make a determination as to which resource may be used. In many embodiments, a data storage system may solely use local hardware resources. In various embodiments, a data storage system may solely use resources available form one or more public clouds. In certain embodiments, a data storage system may be enabled to use both local hardware resources and resources in one or more public clouds simultaneously. In many embodiments, a data storage system may be enabled to shift hardware usage from local hardware resources to cloud computing resources, and vice versa, seamlessly. In various embodiments, a shift from local resources to cloud resources may enable maintenance work to be completed on one or more devices within a data storage system.

Figure 12:
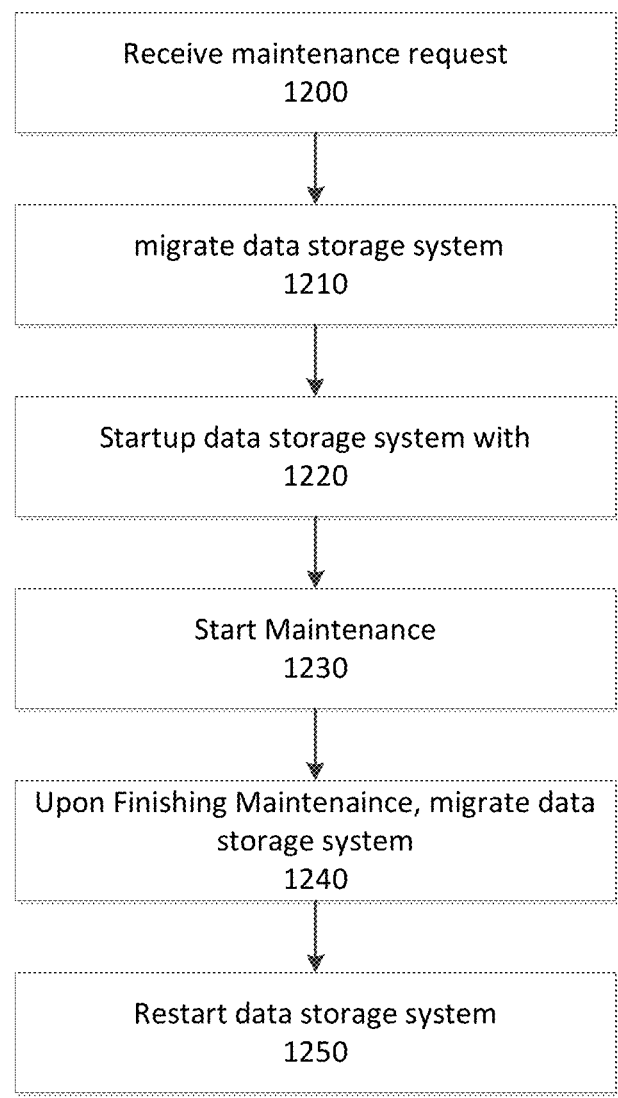
FIG. 12 is a simplified flowchart of a method of maintaining a data storage system, in accordance with an embodiment of the present disclosure.

Refer now to the example embodiment of FIGS. 11 and 12. FIG. 12 is a simplified flowchart of a method of maintaining a data storage system, in accordance with an embodiment of the present disclosure. As shown, Data storage system 1110 includes job management module 1120, optimization module 1122, and cache 1115. Data storage system 1110 is enabled to communicate with data storage 1125, public cloud 1130, and application 1135. In this embodiment, Application 1135 is using data storage system 1110 to fulfill resource needs of application 1135. Data storage system 1110 is enabled to provide resource to application 1135 through using cache module 1115 and data storage array 1125. As shown, data storage system 1110 receives maintenance request (Step 1200). Based on information from the maintenance request and configuration information from Application 1135, data storage system 1110 creates a cloud implementation in public cloud 1130 using job management 1120 and optimization module 1122. Data storage system 1110 migrates application data from Application 1135 to public cloud 1130 (Step 1210). Once migration is complete, job management 1120 communicates with public cloud 1130 and starts servicing application 1135 using public cloud 1130 (Step 1220). At this point, a user and/or administrator is enabled to start maintenance on data storage system 1110 (Step 1230). Upon finishing maintenance of data storage system 1110, job management module 1120 migrates application data from public cloud 1130 to data storage system 1110 (Step 1240) and service application 1135 using resources from data storage system 1110 (Step 1240). In many embodiments, a data storage system may be enabled to transfer application data between the data storage system and a public cloud seamlessly without the associated application noticing a stop in service. The data storage system 1110 is then restarted (Step 1250).

Figure 13:
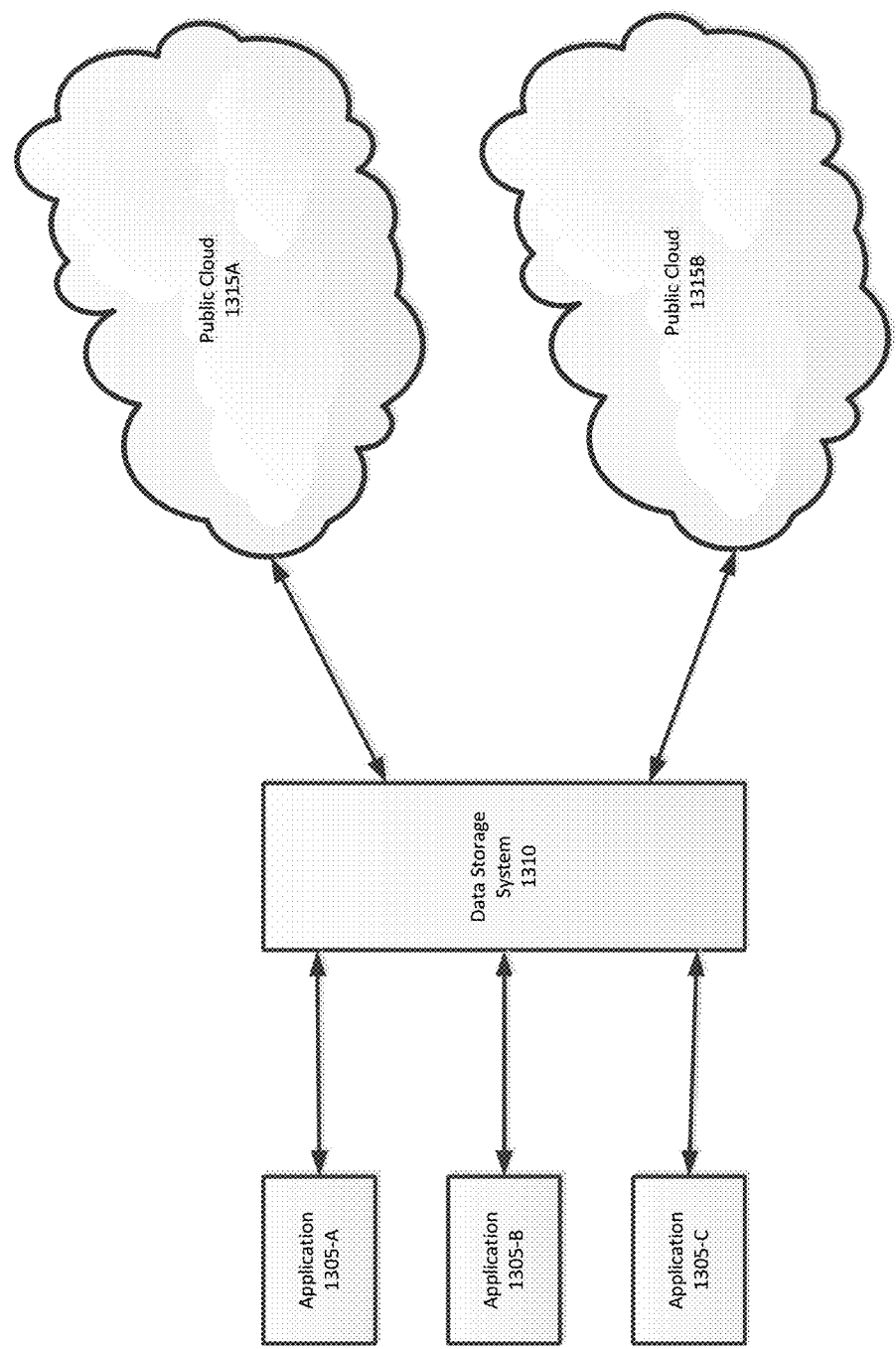
FIG. 13 is a further alternate simplified illustration of an implementation of a data storage system, in accordance with an embodiment of the present disclosure.

Refer now to the example embodiment of FIG. 13. FIG. 13 is a further alternate simplified illustration of an implementation of a data storage system, in accordance with an embodiment of the present disclosure. As shown, data storage system 1310 is in communication with applications (1305-A, 1305-B, 1305-C, 1305 generally) and public clouds (1315A, 1315B, 1315 Generally). In this embodiment, data storage system is enabled to service resource needs of applications 1305 through local resources available through data storage system 1310 and through cloud resources available through public clouds 1315.

Figure 14:
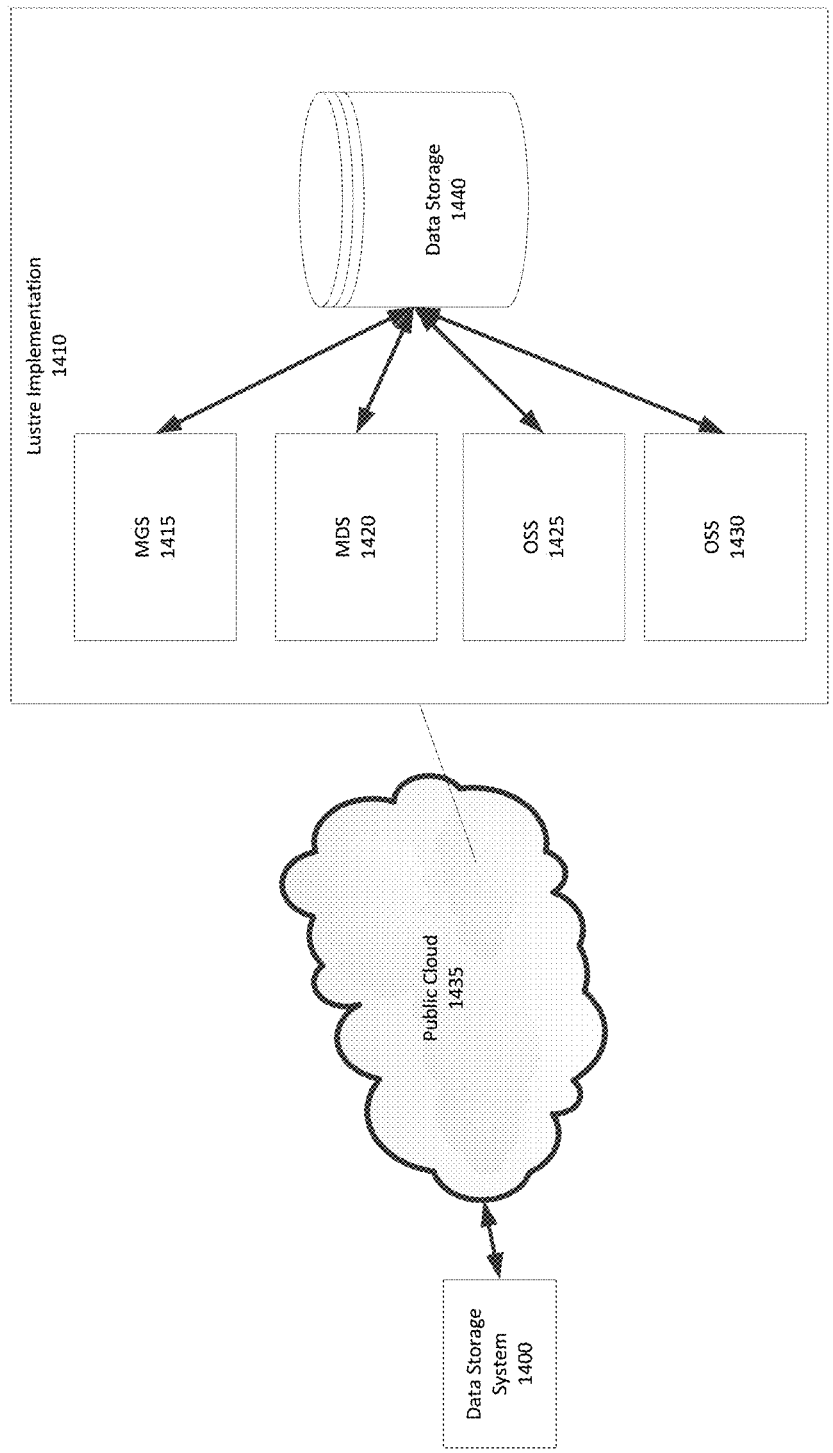
FIG. 14 is a simplified illustration of a public cloud implementing a Lustre implementation, in accordance with an embodiment of the present disclosure.

Refer now to the example embodiment of FIG. 14. FIG. 14 is a simplified illustration of a public cloud implementing a Lustre implementation, in accordance with an embodiment of the present disclosure. As shown, data storage system 1400 is enabled to communicate with public cloud 1435. Data storage system 1400 is enabled to use Lustre File System implementation 1410 created on public cloud 1435. In this embodiment, Lustre implementation 1410 includes MGS 1415, MDS 1420, and OSS 1425, 1430. MGS 1415, MDS 1420, and OSS 1425, 1430 are enabled to use data storage 1440 when processing data I/O requests at public cloud 1435. In many embodiments, a public cloud may be enabled to implement one or more High Performance Computing environments and/or one or more data storage systems to support execution of applications.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 15:
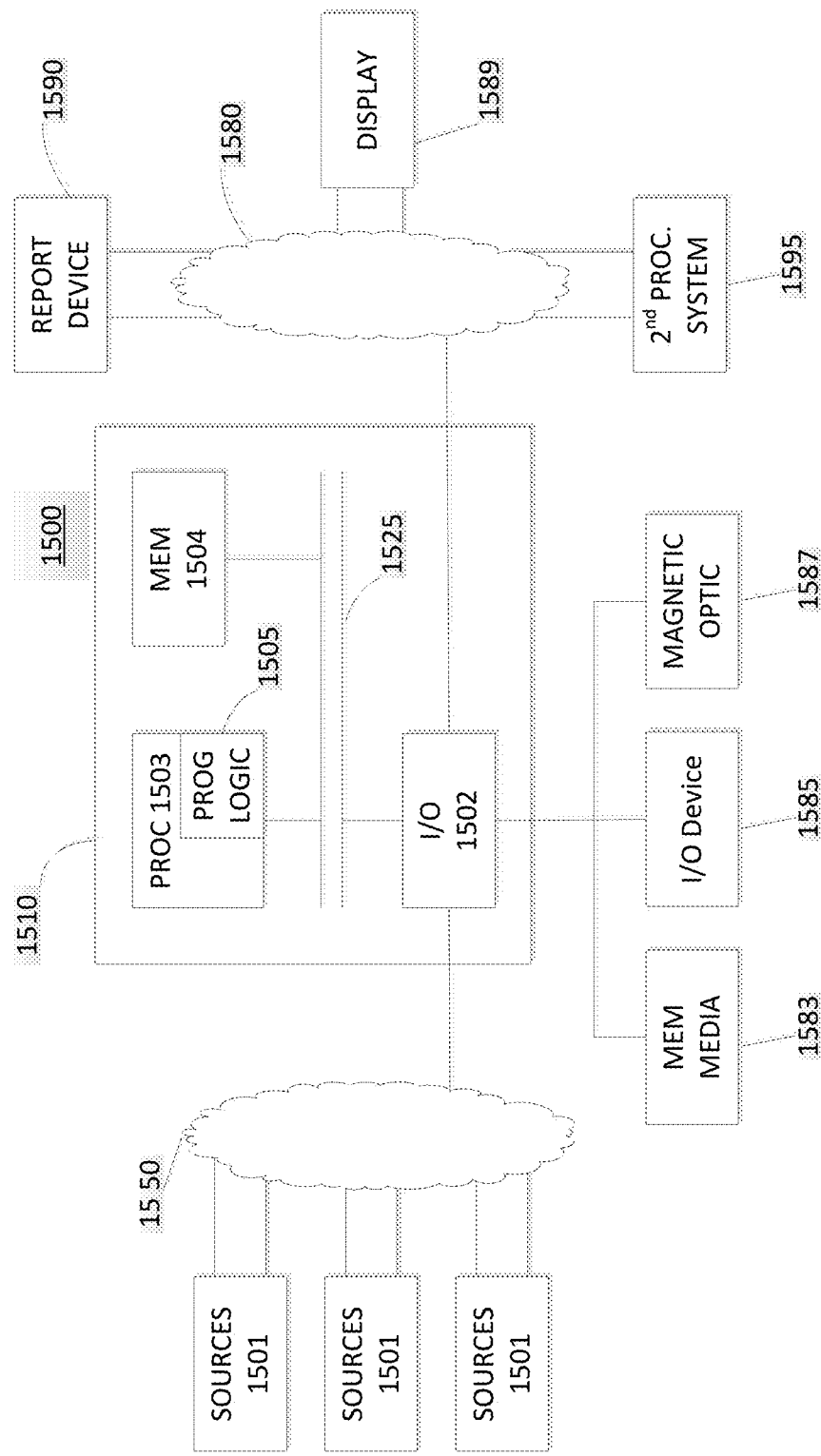
FIG. 15 is an example of an embodiment of an apparatus that may utilize the techniques described herein, in accordance with an embodiment of the present disclosure.

FIG. 15 is a block diagram illustrating an apparatus, such as a computer 1510 in a network 1500, which may utilize the techniques described herein according to an example embodiment of the present invention. The computer 1510 is configured to interact with multiple data sources 1501 via a network 1550. The computer 1510 may include one or more I/O ports 1502, a processor 1503, and memory 1504, all of which may be connected by an interconnect 1525, such as a bus. Processor 1503 may include program logic 1505. The I/O port 1502 may provide connectivity to memory media 1583, I/O devices 1585, and drives 1587, such as magnetic or optical drives. The computer 1510 interfaces via a network 1580 with a report device 1590 and a display 1589. The computer 1510 also interfaces via the network 1580 with an additional processing system denoted as second processing system 1595. When the program code is loaded into memory 1504 and executed by the computer 1510, the machine becomes an apparatus for practicing the invention. When implemented on one or more general-purpose processors 1503, the program code combines with such a processor to provide a unique apparatus that operates analogously to specific logic circuits. As such, a general purpose digital machine can be transformed into a special purpose digital machine.

Figure 16:
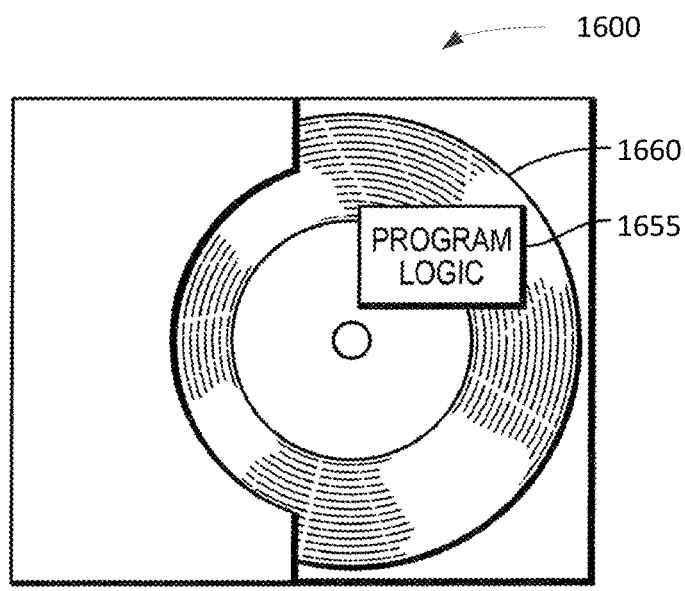
FIG. 16 is an example of a method embodied on a computer readable storage medium that may utilize the techniques described herein, in accordance with an embodiment of the present disclosure.

FIG. 16 is a block diagram illustrating a method embodied on a computer readable storage medium 1660 that may utilize the techniques described herein according to an example embodiment of the present invention. FIG. 16 shows Program Logic 1655 embodied on a computer-readable medium 1660 as shown, and wherein the Logic is encoded in computer-executable code configured for carrying out the methods of this invention and thereby forming a Computer Program Product 1600. Program Logic 1655 may be the same logic 1505 on memory 1504 loaded on processor 1503 in FIG. 15. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-16. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method for managing a cloud computing resource in communication with a data storage system, the computer-executable method comprising:
    providing one or more levels of data storage resources from the cloud computing resource;
    receiving configuration information at the data storage system related to a host application;
    determining an optimized configuration for the host application, wherein the optimized configuration is enabled to include local resources and the data storage resources from the cloud computing resource;
    wherein the determining of the optimized configuration is based on one or more operating parameters of the host application;
    creating an implementation of the optimized configuration based on one or more of the data storage resources enabled to be accessed by the data storage system using the cloud computing resource;
    monitoring the implementation of the optimized configuration;
    wherein the monitoring comprises determining whether the one or more operating parameters are being met;
    transmitting a remediation request to the cloud computing resource in response to a determination that the one or more operating parameters are not being met; and
    sending one or more requests to a user of the data storage system allowing the user to opt for increased priority access to one or more of the data storage resources in response to a determination that the one or more operating parameters are not being met.

2. The computer-executable method of claim 1, wherein the implementation of the optimized configuration uses the cloud computing resource to execute the host application.

3. The computer-executable method of claim 1, wherein the implementation of the optimized configuration uses the data storage system and the cloud computing resource to execute the host application.

4. The computer-executable method of claim 1, wherein the determining of the optimized configuration is further based on a cost of the cloud computing resource.

5. The computer-executable method of claim 1, wherein a first parameter of the one or more operating parameters is execution time.

6. The computer-executable method of claim 1, wherein a first parameter of the one or more operating parameters is maximum cost.

7. The computer-executable method of claim 1, further comprising:
    receiving a request for maintenance of at least a portion of the data storage system, wherein the implementation of the optimized configuration is based at least in part on the request for maintenance;
    migrating data from at least the portion of the data storage system to the one or more of the data storage resources from the cloud computing resource;

performing the maintenance of at least the portion of the data storage system following the migrating; and migrating the data from the one or more of the data storage resources to at least the portion of the data storage system following the performing of the maintenance.

8. A system, comprising:

a data storage system;

a cloud computing resource in communication with the data storage system; and computer-executable logic encoded in memory of one or more computers in communication with the data storage system to enable the management of the data storage system in conjunction with the cloud computing resource, wherein the computer-executable program logic is configured for the execution of:

providing one or more levels of data storage resources from the cloud computing resource;

receiving configuration information at the data storage system related to a host application;

determining an optimized configuration for the host application, wherein the optimized configuration is enabled to include local resources and the data storage resources from the cloud computing resource;

wherein the determining of the optimized configuration is based on one or more operating parameters of the host application;

creating an implementation of the optimized configuration based on one or more of the data storage resources enabled to be accessed by the data storage system using the cloud computing resource;

monitoring the implementation of the optimized configuration;

wherein the monitoring comprises determining whether the one or more operating parameters are being met;

transmitting a remediation request to the cloud computing resource in response to a determination that the one or more operating parameters are not being met; and sending one or more requests to a user of the data storage system allowing the user to opt for increased priority access to one or more of the data storage resources in response to a determination that the one or more operating parameters are not being met.

9. The system of claim 8, wherein the implementation of the optimized configuration uses the cloud computing resource to execute the host application.

10. The system of claim 8, wherein the implementation of the optimized configuration uses the data storage system and the cloud computing resource to execute the host application.

11. The system of claim 8, wherein the determining of the optimized configuration is further based on a cost of the cloud computing resource.

12. The system of claim 8, wherein a first parameter of the one or more operating parameters is execution time.

13. The system of claim 8, wherein a first parameter of the one or more operating parameters is maximum cost.

14. The system of claim 8, wherein the computer-executable program logic is further configured for the execution of:

receiving a request for maintenance of at least a portion of the data storage system, wherein the implementation of the optimized configuration is based at least in part on the request for maintenance;

migrating data from at least the portion of the data storage system to the one or more of the data storage resources from the cloud computing resource;

performing the maintenance of at least the portion of the data storage system following the migrating; and migrating the data from the one or more of the data storage resources to at least the portion of the data storage system following the performing of the maintenance.

15. A computer program product for managing a cloud computing resource in communication with a data storage system, the computer program product comprising:

a non-transitory computer readable medium encoded with computer-executable program code, the code configured to enable the execution of:

providing one or more levels of data storage resources from the cloud computing resource;

receiving configuration information at the data storage system related to a host application;

determining an optimized configuration for the host application, wherein the optimized configuration is enabled to include local resources and the data storage resources from the cloud computing resource;

wherein the determining of the optimized configuration is based on one or more operating parameters of the host application;

creating an implementation of the optimized configuration based on one or more of the data storage resources enabled to be accessed by the data storage system using the cloud computing resource;

monitoring the implementation of the optimized configuration;

wherein the monitoring comprises determining whether the one or more operating parameters are being met;

transmitting a remediation request to the cloud computing resource in response to a determination that the one or more operating parameters are not being met; and sending one or more requests to a user of the data storage system allowing the user to opt for increased priority access to one or more of the data storage resources in response to a determination that the one or more operating parameters are not being met.

16. The computer program product of claim 15, wherein the implementation of the optimized configuration uses the cloud computing resource to execute the host application.

17. The computer program product of claim 15, wherein the implementation of the optimized configuration uses the data storage system and the cloud computing resource to execute the host application.

18. The computer program product of claim 15, wherein the determining of the optimized configuration is further based on a cost of the cloud computing resource.

19. The computer program product of claim 15, wherein a first parameter of the one or more operating parameters is execution time.

20. The computer program product of claim 15, wherein a first parameter of the one or more operating parameters is maximum cost.

* * * * *